United States Patent

[11] 3,616,338

| [72] | Inventors | T. O. Paine<br>Deputy Administrator of the National Aeronautics and Space Administration with respect to an invention of;<br>Sam Naiditch, Altadena, Calif. |
|------|-----------|---|
| [21] | Appl. No. | 756,834 |
| [22] | Filed | Sept. 3, 1968 |
| [45] | Patented | Oct. 26, 1971 |

[54] METHOD OF PRODUCING CRYSTALLINE MATERIALS
7 Claims, 1 Drawing Fig.

[52] U.S. Cl. ................................................ 204/130, 204/59
[51] Int. Cl. ..................................................... C01d 7/34
[50] Field of Search ........................................... 204/130, 59

[56] References Cited
UNITED STATES PATENTS

| 3,243,363 | 3/1966 | Helwig ........................ | 204/164 |
|-----------|--------|------------------------------|---------|
| 3,053,741 | 10/1962 | Medina ....................... | 204/43 |

FOREIGN PATENTS

| 320,818 | 10/1929 | Great Britain ............... | 204/59 |

*Primary Examiner*—John H. Mack
*Assistant Examiner*—R. L. Andrews
*Attorneys*—Monte F. Mott, J. H. Warden and G. T. McCoy

ABSTRACT: A method for the electrodeposition of metal crystals from a dense gaseous electrolyte. A salt of the material to be deposited is dissolved in a suitable solvent and the temperature of the solution raised to at least its critical temperature prior to electrolysis.

PATENTED OCT 26 1971 3,616,338
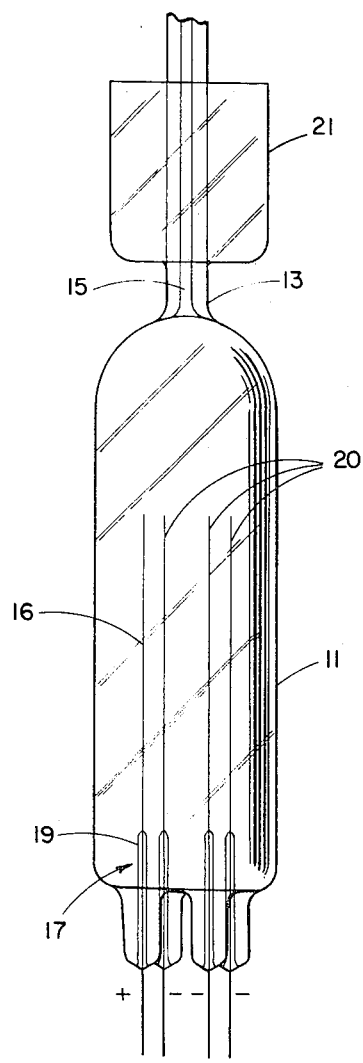
INVENTOR.
SAM NAIDITCH
BY
ATTORNEYS

3,616,338

METHOD OF PRODUCING CRYSTALLINE MATERIALS

ORIGIN OF THE INVENTION

The invention described herein was made in the performance of work under a NASA contract and is subject to the provisions of Section 305 of the National Aeronautics and Space Act of 1958, Public Law 83-568 (72 Stat. 435; —42 USC 257).

BACKGROUND OF THE INVENTION

1. Field of the Invention

This invention is in the field of crystal growth. More particularly the invention relates to a method of electrodeposition of crystals from a dense gaseous medium.

2. Description of the Prior Art

Crystals of pure material are finding increasing importance in today's technology. One area embracing the utilization of such crystals is the field of semiconductors. Additionally, the utilization of whiskers of a material are important in the formation of high strength composites.

A typical prior art method for synthesis of single crystals is known as hydrothermal crystallization where seeds of a crystal to be grown are placed in an autoclave additionally containing a solution of the material to be crystallized. The crystals are grown on the seeds at high temperatures and pressures. This crystal formation occurs when the vessel is completely filled with a dense gaseous solution, normally with water, as the gaseous solvent. Crystal growth for quartz has typically been accomplished utilizing the hydrothermal synthesis. Though the crystals have been of a high quality, the technique has been limited in utilization due to the high temperatures and pressures, as well as very slow growth rate.

SUMMARY OF THE INVENTION

The herein invention concerns a new method for the growth of crystals. As indicated, the closest previous technique for the growth of crystals involved the hydrothermal synthesis. This invention also utilizes a dense gaseous phase from which the crystals are grown. However, unlike the hydrothermal process which utilizes concentration gradients or rates of solution as the driving force, the herein invention utilizes electricity as a driving force since the process of this invention involves electrodeposition. It differs from the usual electrodeposition in that it enables the successful crystal production out of the most common and useful class of solvents for electrodeposition, namely, those with active hydrogens such as in hydrogen-bonded solvents. Normally, use of such solvents leads to coproduction of gaseous hydrogen and the desired electrodeposit. Normally, the coproduced gaseous hydrogen interferes with crystal production by forming bubbles on the crystal surface. This invention enables the use of these useful solvents, or others which coliberate gases, for the production of crystals in the presence of coproduced hydrogen.

Briefly, the invention is practiced by dissolving the material to be crystallized in a suitable solvent. As part of the herein invention, it has been found that dense gaseous ammonia provides a superior solvent for some metallic materials and could allow the formation of crystals of materials at low temperatures. It has been found that when the solution is raised above its critical temperature, crystals of high purity are deposited on the cathode element utilized. It should be apparent that since the deposition occurs from a dense gaseous phase, the process is carried out in a sealed vessel which contains the cathode and anode, as well as the solution utilized. As indicated, particularly outstanding results are achieved when ammonia is utilized as the solvent. Though other solvents can be used to practice the invention, for uni-univalent salts ammonia is found to be a most suitable material. It is believed that the invention will be better understood from the following detailed description, examples and drawing, in which:

BRIEF DESCRIPTION OF THE DRAWING

The FIG. is a schematic representation of a device utilized to practice the method of the invention.

PREFERRED EMBODIMENTS

The herein invention provides a method for the electrodeposition of a crystalline coating and/or crystals out of a dense gaseous electrolyte. The term dense gas as used herein refers to the solvent material utilized. The density of the solvent in the gaseous state should be sufficient to achieve a solution of most or all of the salt utilized near or above the critical temperature of the solution. It has been found through experimentation that, as a rough rule of thumb, sufficient density can often be achieved if the density in the gaseous state is about 50 percent of that in the initial starting liquid state. It should be pointed out that solubility will increase with solvent density. Therefore, the critical temperature of the solution will be increased.

The electrodeposition is accomplished in a closed vessel, which contains a suitable anode and cathode. The electrodes can be comprised of suitable substrate material, such as platinum wires, for crystal growing. The solvent is placed in the vessel together with a soluble salt of the metal desired to be deposited. The higher the concentration of the salt the greater the practical deposition rate, but the higher the critical temperature and pressure of the solution. The concentration of the starting solution is thus not critical. There is a tradeoff between highly concentrated solutions and those that are less concentrated. The highly concentrated solutions require higher temperatures and pressures to achieve conditions necessary for such solution. However, at these more severe conditions, the rate of deposition is greatly increased. The quantity of solvent and the internal volume of the flask determine the solvent density above the supercritical temperature. The vessel is then sealed and raised to the desired plating temperature.

The current for the crystal deposition is not believed critical. Successful crystal deposition, for example, can be achieved at current densities of 1 to 2 ma/cm.$^2$. The voltage is adjusted to provide the desired current density. As the crystals cover and grow on the cathode, they effectively increase the cathode size. As a result it is possible to grow larger crystals in a shorter time. The electrodeposition can then be accomplished with increasing current thereby maintaining constant current density. The current is allowed to increase as the deposit, and thus the effective electrode area, grows.

One outstanding advantage of the use of a dense gaseous electrolyte relates to the production of hydrogen during the electrochemical reactions involved. Because of the absence of surface tension in the dense gaseous medium, hydrogen produced during electrolysis, when desorbed, diffuses away from the cathode surface rather than being trapped there as bubbles. This provides for a continuous surface on which the deposit can grow without interruption. These bubbles interfere with continuous growth of crystalline deposits in a liquid electrolyte. In liquid electrolytes other than ammonia, there is tendency for an eroded surface layer to form on the cathode, interfering with clean continuous crystalline growth. This may not occur in an ammonia medium.

A solvent that reacts with a metal to be soluble in the crystalline state can produce a chemisorbed surface which may interfere with continuous crystal growth. It has been found, as indicated, that one of the most preferable solvents utilized in accord with the method of this invention is ammonia, since it is frequently chemically inert toward metals. As a result, the surface of the metal being deposited may be very clean. Additionally, the use of ammonia may allow the deposition of materials heretofore not subjected to such processes. The metal or other substance to be reduced in accord with the electrodeposition process is naturally in the form of a soluble salt. The anion portion of the salt is not critical to the herein invention. Thus a salt is chosen which is most soluble, ionized, and stable.

It should be pointed out that even solvents such as water could be utilized in the practice of the herein invention. However, it may be definitely preferred for reasons aforegiven that the solvent be nonreactive with the metal or material being reduced.

The rate of deposition is dependent upon, as indicated above, the current density and the efficiency of the process, i.e., the fraction of the electroreduced material that is in the desired state. For example, as the current density increases, generally more hydrogen is produced and the efficiency would decrease. The efficiency might be dependent on the concentration and state of the electrolyte, the temperature, and the nature of the surface, e.g., its hydrogen overvoltage. It is believed that the invention will be better understood from the following detailed examples:

EXAMPLE I

A cell as shown in the FIG. was made from 30 mm. (O.D.) borosilicate glass tubing. The cell 11 was 8 cm. long and had an internal volume between 35 cc. and 40 cc. A filling tube 13, having a small capillary passage 15 therein, as affixed to one end the cell. The anode 16 was a platinum wire of 0.4 mm. diameter, fused to a 0.75 mm. diameter tungsten wire. The tungsten wire was brought into the cell through a uranium glass seal 17. The glass seal extended along the anode 16 to completely cover the tungsten and part of the platinum wires. The portion 19 of the seal that extended into the cell was about 2 cm., while the wire extended another 5 cm. into the cell. Three cathodes 20 were brought into the cell and were identical to the anode 16. Additionally it is to be noted that the ends of the cathodes 20 extending within the cell were cut by a wire cutter such that the end of the wire was a wedge shape. Surrounding the fill tube 13 was a freeze cup 21 whose function will be explained below.

In order to prepare the cell for deposition, reagent grade silver nitrate was introduced into the cell and the cell was then connected to a vacuum system. The cell was then baked out under vacuo at 100° C. for an hour. The purpose of this was to get rid of volatilizable materials, such as sorbed water.

Tank ammonia having a purity of 99.99 percent as purified further by passing through an activated charcoal trap and storing overnight as a liquid over metallic sodium. After the cell had been prepared as indicated above, the ammonia was then condensed in the cell which was maintained at −78° C. with a dry ice alcohol bath. When the liquid level rose to a calibrated mark on the cell, the introduction of the ammonia was then stopped. The mark was located at 50 percent of the sealed off cell volume. Thus, at −78° C. the filled cell contained 0.036 N $AgNO_3$ in liquid ammonia.

The solution in the cell was maintained at −78° —C. and liquid nitrogen was poured into the freeze cup 21 surrounding the fill tube. A solid ammonia plug formed in the capillary 15 as a result of the liquid nitrogen in the freeze cup. The fill tube was then again connected to a high vacuum source and pumped to remove any volatiles above the freeze plug, especially those produced during the seal-off. The pumping continued until a high vacuum had been attained, then the cell was sealed off by fusion of the glass.

The exposed wires from the cell were soldered onto leads going through a head in a high pressure vessel and the entire cell 11 was then placed in the pressure vessel. External nitrogen pressure inside the pressure vessel was used to keep the glass under compression preventing the ammonia pressure within the cell from rupturing it. The external pressure was kept about 30 atmospheres above the predicted internal pressure during the heating of the cell and the electrodeposition. The heating of the cell was accomplished electrically by passing current through a coil built within the pressure vessel walls.

EXAMPLE II

Each cell as shown in the FIG. is capable of three separate runs by individually connecting one of the three cathodes to a negative potential at a time for the given run. An initial series of runs were thus made, at current densities from 1 to 2 ma/cm.$^2$ for from 600 to 800 seconds. The purpose of the runs was to determine the effect of the state of the electrolyte upon the deposition. These runs resulted in the determination that deposits made from the liquid become increasingly crystal in appearance as the critical temperature is approached. At −70° C. the deposit on the platinum electrode appeared black, fluffy and nonmetallic. At 15° C. the deposit on the cathode was smooth and silvery, giving a spectral reflection. At 103° C., about 30° below the critical temperature, the deposit was silvery or metallic in appearance but somewhat sparkly, suggesting some crystallinity in the deposit. Three different runs were made using each cathode to obtain the three temperature conditions.

EXAMPLE III

To determine the crystalline character of the deposits above the critical point of ammonia, electrodeposition was carried out for 690 seconds at a current density of 1.6 ma/cm.$^2$ and a voltage of 0.5 volts. The temperature was 140° C. The deposit on the body of the electrode appeared to be made up of tiny crystals while at the wedge-shaped tip there were several projections of what appeared to be single crystals of silver. These were in the form of four-sided square cylinders with uniform cross section over most of their length but starting from a narrower base and ending in a pyramidal point. In an attempt to grow crystals, the cathodes were cut off at the end of the glass covering 19, leaving only a wedge-shaped tip exposed. Because only the sharp wedge-shaped tip was exposed, the dendrites or larger needles tended to cover the entire cathode and rapidly increased the effective cathode size as they grew. As a result, it as possible to grow much larger dendrites in a shorter period of time. In this example, the electrodeposition was done at constant voltage rather than constant current. The current was allowed to increase as the deposit and hence the effective electrode area grew. The voltages used varied from 1.05 volts to 0.85 volts, while the total charges passed were 2.2 and 2.4 coulombs respectively. During runs made utilizing the cutoff electrodes, needlelike growths of up to 6 mm. in length were obtained. Microscopic examination of the growth indicated it consisted of a three-sided central stem coming to a sharp point at one end and having the sides covered with short growths. The short growth showed both rectangular and hexagonal symmetries, while there were also some longer pointed branches having three sides like the central stem.

As can be seen from the foregoing example, there was a strong tendency for crystalline needles or dendrites to grow from sharp corners on the cathode and the dense gaseous system above the critical temperature of ammonia. It should further be noted that in the aforegoing examples, no supporting electrolytes were required to effect the electrodeposition. Further, there were no precautions taken with regard to current density. It appeared that the needles or dendrites were obtained on sharp corners whenever electrodeposition was performed in the super critical region of ammonia. It is also pointed out that as the critical temperature region is approached, the differences between liquid and gaseous fluids become small. Thus it is not surprising that at as low as 100° —C. the surface of the cathode became sparkly due to small crystals.

It should be pointed out that the aforegoing description pertains to initially mixing the material to be crystallized with a solvent in the liquid state. In the specific examples, ammonia was condensed into the container in order to avoid the conditions necessary to maintain it in the gaseous state. However, solvents which are in the gaseous state at ambient conditions can be used as such and never converted to a liquid prior to raising the solution to its critical temperature.

What is claimed is:

1. A method of producing crystals of a metal material comprising:

providing a closed container having a cathode and anode therein, filling said container with a dense gaseous solution comprised of a metal salt, from which the crystalline material is produced, dissolved in a solvent therefor, and directing sufficient electrical current through said cathode and anode to form crystals of said material on the cathode.

2. The method of claim 1 wherein said dense gaseous solution is at least about its critical temperature.

3. A method of growing crystals of a metal comprising:

mixing a metal salt from which the crystalline material is produced with a suitable solvent therefor, placing the resulting solution in a closed container, disposing electrodes comprising an anode and cathode in said container, raising the temperature of said solution to form a dense gaseous solution, directing electrical current to said electrodes, and depositing said crystals of said material on said cathode.

4. The method of claim 3 comprising:

raising the temperature of said solution to at least about its critical temperature.

5. The method of claim 4 wherein said material is a univalent metal and said solvent is ammonia.

6. The method of claim 3 wherein said solvent is initially in the liquid state when mixed with said salt.

7. The method of claim 6 wherein the density of said mixture in the gaseous state is at least about one-half the density of said mixture in the liquid state.

* * * * *